United States Patent
Stoin et al.

(10) Patent No.: US 9,956,597 B2
(45) Date of Patent: May 1, 2018

(54) REMEDIATION OF CONTAMINATED SOILS

(71) Applicant: YISSUM RESEARCH DEVELOPMENT COMPANY OF THE HEBREW UNIVERSITY OF JERUSALEM LTD., Jerusalem (IL)

(72) Inventors: Uri Stoin, Jerusalem (IL); Yoel Sasson, Jerusalem (IL)

(73) Assignee: YISSUM RESEARCH DEVELOPMENT COMPANY OF THE HEBREW UNIVERSITY OF JERUSALEM LTD., Jerusalem (IL)

( * ) Notice: Subject to any disclaimer, the term of this patent is extended or adjusted under 35 U.S.C. 154(b) by 0 days. days.

(21) Appl. No.: 15/308,432

(22) PCT Filed: May 3, 2015

(86) PCT No.: PCT/IL2015/050460
§ 371 (c)(1),
(2) Date: Nov. 2, 2016

(87) PCT Pub. No.: WO2015/170317
PCT Pub. Date: Nov. 12, 2015

(65) Prior Publication Data
US 2017/0056942 A1    Mar. 2, 2017

Related U.S. Application Data

(60) Provisional application No. 61/988,223, filed on May 4, 2014.

(51) Int. Cl.
*B09C 1/08* (2006.01)
*B09C 1/02* (2006.01)

(52) U.S. Cl.
CPC .................. *B09C 1/08* (2013.01); *B09C 1/02* (2013.01); *B09C 2101/00* (2013.01)

(58) Field of Classification Search
CPC ......... B09C 1/08; B09C 1/02; B09C 2101/00; B09C 1/00
See application file for complete search history.

(56) References Cited

U.S. PATENT DOCUMENTS

2009/0087265 A1* 4/2009 Lundy ....................... B09C 1/08
                                                             405/128.25
2014/0348735 A1  11/2014 Sasson et al.

FOREIGN PATENT DOCUMENTS

| CA | 2059488 | 8/1999 |
|---|---|---|
| CA | 2 492 606 | 6/2006 |
| KR | 10-2009-0025486 | 3/2009 |
| KR | 10-0954206 | 4/2010 |

(Continued)

OTHER PUBLICATIONS

International Search Report for PCT/IL2015/050460 dated Oct. 20, 2015, 4 pages.

(Continued)

*Primary Examiner* — Carib A Oquendo
(74) *Attorney, Agent, or Firm* — Nixon & Vanderhye P.C.

(57) ABSTRACT

The invention provides a process for treating a soil contaminated with a pollutant selected from the group consisting of petroleum products and aromatic hydrocarbons, comprising bringing into contact with said soil an aqueous solution in which hydrogen peroxide and hydroxide source are combined.

13 Claims, 7 Drawing Sheets

(56) References Cited

FOREIGN PATENT DOCUMENTS

WO     WO 2013/093903     6/2013

OTHER PUBLICATIONS

Written Opinion of the ISA for PCT/IL2015/050460 dated Oct. 20, 2015, 5 pages.
L. Andrews, "Infrared Spectrum, Structure, Vibrational Potential Function, and Bonding in the Lithium Superoxide Molecule $LiO_2$", *The Journal of Chemical Physics*, vol. 50, No. 10, pp. 4288-4299 (May 1969).
L. Andrews, "Infrared Spectra and Bonding in the Sodium Superoxide and Sodium Peroxide Molecules", *The Journal of Physical Chemistry*, vol. 73, No. 11, Nov. 1969, pp. 3922-3928.
U. Stoin et al., "Fast and complete in situ mineralization of contaminated soils using a novel method for superoxide generation", *Royal Society of Chemistry Advances*, vol. 5 (2015), pp. 6571-6577.
U. Stoin et al., "In Situ Generation of Superoxide Anion Radical in Aqueous Medium under Ambient Conditions", *Chemical Physical Chemistry*, vol. 14 (2013), pp. 4158-4164.

\* cited by examiner

REMEDIATION OF CONTAMINATED SOILS

This application is the U.S. national phase of International Application No. PCT/IL2015/050460 filed May 3, 2015 which designated the U.S. and claims the benefit of U.S. Provisional Application No. 61/988,223 filed May 4, 2014, the entire contents of each of which are hereby incorporated by reference.

The contamination of soils and groundwater by organic chemicals remains a significant world-wide problem, even after decades of research. It has been estimated that only in the European Union 3.5 million sites are potentially contaminated. The most common soil pollutants are: polychlorinated hydrocarbons (PCHs), polycyclic aromatic hydrocarbons (PAHs), polychlorinated biphenyls (PCBs), chlorinated solvents, petroleum products and pharmaceutical leftovers. The contamination of soils and sediments by persistent organic pollutants (POPs) such as PAHs, PCHs and petroleum products are an environmental concern because of their high chronic toxicity to both animals and humans, and their long-lasting sorption by soils and sediments.

During the past decades, several new and innovative solutions for efficient contaminant removal from soils have been investigated. Ex situ technologies include excavating soils followed by land filling, thermal desorption, thermal destruction (incineration), soil washing, biological remediation and vacuum extraction. However, the ex situ methods generally have low efficiency, long time of process and high costs. In addition, some of these methods cannot destroy contaminants and in some cases may cause a secondary pollution. In-situ technologies include chemical oxidation or other chemical treatment (such as solvent extraction), photocatalysis and electrochemical treatment.

Photocatalysis for organic pollutants degradation has been suggested using both semiconductors and solar energy. For example, photocatalysts based on pure titanium dioxide were used for the purification of oil-contaminated soil. However, these methods are characterized by a low efficiency and long process, and are only useful for the uppermost layer of the soil.

Electrokinetic (EK) and electrochemical remediation is the application of a low electric potential or direct current to electrodes inserted into the soil, inducing electroosmotic flow of the pore fluid and the electromigration of charged ions toward the electrode of opposite charge. This method is often coupled with technologies such as in situ chemical oxidation. The limitation of this method is its long remediation time; the time, which may vary from several days to even a few years.

In situ chemical oxidation offers several advantages over conventional treatment technologies, such as potential lower cost, less disruption to the environment, and reduced worker exposure to the hazardous materials. In addition, this technology does not generate large volumes of waste that must be disposed of and treated. In addition to this, it is also implemented over a much shorter time frame. Since the reaction is almost immediate, such treatment is far more rapid than biological techniques, and can be faster than thermal or vapor recovery technologies. The most common oxidizing agents used in in situ technology are, among others, ozone and Fenton's reagent. However, the in situ oxidation technology known to date has a several disabilities, such as the need of pH control and difficulties controlling in situ heat and gas production. Furthermore, the oxidation can take days to weeks, which is still slow.

A novel method for the in-situ generation of a remarkably stable superoxide anion in water by reacting sodium or potassium hydroxide with hydrogen peroxide under ambient conditions has been recently reported (WO 2013/093903; Stoin, U. et al. Chem Phys Chem, 2013, 14, 4158). The superoxide radical anion ($O_2$-.) is an active oxygen species that possesses both anionic and free radical properties. It has been shown in the abovementioned publications that this reagent displays properties of a super oxidizing agent. The aqueous reagent was effectively utilized for the destruction of bulk of carbon tetrachloride and other chlorinated methane and ethane compounds, including in soil (WO 2013/093903).

However, it is of utmost importance to find a treatment method that is useful to destruct more complex soil contaminants, other than halogenated organic contaminants, such as aliphatic hydrocarbons, aromatic hydrocarbons, and in particular for the destruction of the very complex diesel oil and crude oil, which each contains a diverse and large group of contaminants.

The present inventors have now demonstrated the unique and rapid reaction of superoxide with various hydrocarbons and other organic contaminants in the soil. In addition to the advanced oxidizing ability of the material the reagent of the present invention was found to be an extremely potent nucleophile and was shown to swiftly (within minutes to hours) react at ambient conditions also with petroleum products. Thus, a variety of pollutants in the soil can be rapidly oxidized and totally mineralized, including a wide range of aromatics and even petroleum and petroleum products.

The present invention relates to a novel process for the treatment of soils contaminated by complex contaminants, such as petroleum products, a process which enables the treatment of contaminants far more complex than halogenated hydrocarbons or halogenated solvents disclosed in WO 2013/093903.

The present invention is therefore primarily directed to a process for treating a soil contaminated with a pollutant selected from the group consisting of petroleum products and aromatic hydrocarbons, comprising bringing into contact with said soil an aqueous solution in which hydrogen peroxide and hydroxide source are combined (under conditions allowing the generation of superoxide).

The invention is especially related a site remediation (in situ) process, comprising allowing alkali hydroxide and hydrogen peroxide to mix in an aqueous form in the contaminated soil, e.g., by injecting into the contaminated soil a stream of aqueous alkali hydroxide solution and a stream of aqueous hydrogen peroxide solution, or a combined stream of both solutions, such that the mol ratio between the hydrogen peroxide and the hydroxide ion is preferably above 1.1:1, more preferably above 1.2:1, e.g., in the range of 1.2:1 to 1.8:1, with a ratio of at least 1.4:1, e.g., from 1.4:1 to 1.6:1, and especially 1.5:1, being most preferred. The concentration of the alkali hydroxide and hydrogen peroxide in the injected stream solutions are not less than 1.5 M and 2.25 M, respectively. The hydrogen peroxide and the hydroxide ion (hereinafter this combination is sometimes named "the aqueous reagent") are delivered and distributed throughout the region to be treated.

The alkali hydroxide solution and hydrogen peroxide solution can be successively injected to the contaminated soil using two separate streams, in any desired order (first the alkali hydroxide solution stream, and then the hydrogen peroxide solution, or in a reverse order). The successively injected streams may be fed essentially immediately one after another, or with some delay in time, e.g., of not less than 1 minute, or not less than 5 minutes, and sometimes not less than 10 minutes or 30 minutes, dependent on soil type. Preferably, the alkali hydroxide solution is introduced first to the soil, allowed to seek into the ground, followed by the addition of the hydrogen peroxide solution. Thus, the invention further provides a process wherein the alkali hydroxide solution is introduced to the soil, followed by addition of hydrogen peroxide solution.

Alternatively, the two separate streams may be injected simultaneously, or over time intervals which partially overlap with one another. The streams are normally injected continuously, but intermittent mode of addition may also be employed.

The introduction of the combination of hydrogen peroxide and alkali hydroxide into contaminated soil, for in-situ chemical oxidation of toxic and persistent organic waste, can be achieved by means of suitable injection systems, adjusting injection pressure and injection depth to increase decontamination efficiency, as shown for example in FIG. 1, whereas a $H_2O_2$ source (1) and a NaOH source (2) are injected via injection tubes using pumps (3, 4) into the contaminated soil (5).

Although the injection of two separate aqueous streams of alkali hydroxide and hydrogen peroxide solutions into the soil has been shown to achieve very good results, as reported below, there are other ways to allow alkali hydroxide and hydrogen peroxide to mix in an aqueous solution in the contaminated soil. For example, according to another embodiment of the invention, the soil can be flooded with the two aqueous solutions, which would gradually seep into the ground. According to yet another embodiment of the invention, the alkali hydroxide is introduced into the soil in a solid form (granules, powder) and the aqueous hydrogen peroxide solution is injected or allowed to seep into the ground to dissolve the solid and react with the dissolved base.

It should be noted that following the treatment, the pH of the soil is alkaline. The pH of the soil may be readily restored to a range acceptable for agricultural utilities by means of the addition of one or more acids such as nitric acid and phosphoric acid. This addition results not only in lowering/neutralizing the pH of the soil, but also in the enrichment of the soil with useful fertilizers. The soil remediation according to the invention allows the mineralization of a variety of complex contaminants, such as petroleum contaminants, leaving no harmful products, or at least the transformation of the contaminant to a more benign substance within a short period of time.

One of the main problems of in situ remediation technologies is that this technology may be implemented in soil that already includes underground infrastructure, for example pipes. Consequently, to gain commercial acceptance, a soil remediation method involving the injection of an oxidizer into the soil must not cause severe corrosion damages to metal surfaces prone to corrosion attack. Experimental results reported below indicate that only very little corrosion is experienced on exposing metal pipes to the aqueous reagent of the invention. Corrosion resistance of carbon steel pipes was tested in the presence of the strong oxidizing agent of the present invention, employing very high quantities thereof (sodium hydroxide and hydrogen peroxide), e.g., four times more than standard reaction conditions. With long exposure time, five times more than standard reaction conditions, the corrosion caused by the present remediation method was 0.012% after 100 hours, almost negligible. Therefore, the present remediation method is harmless to underground existing infrastructure.

Thus, according to another preferred embodiment of the invention, there is provided a process as described herein, wherein metal surfaces are in contact with the soil to be treated (e.g., metal equipment prone to corrosive attack such as carbon steel pipes). Following the process, a corrosion of no more than 0.1% is gravimetrically measured after 100 hours exposure period of carbon steel pipes (carbon steel 1010) to the reagent of the invention.

Pollutants undergoing decomposition and even complete mineralization in soil in the presence of the aqueous reagent of the present invention include petroleum product selected from the group consisting of petroleum, gasoline, crude oil, diesel fuel, diesel oil, aviation fuel, fuel oil, jet fuel, kerosene, liquefied petroleum gases, natural gas liquids, petrochemical feedstocks, and any mixtures thereof. More preferably, the petroleum product is selected from diesel oil and/or crude oil.

The soil to be treated may be contaminated with aromatic and aliphatic organic compounds, for example, with non-halogenated aromatic hydrocarbon compounds. The aromatic rings may include heteroatoms and may be substituted, for example, by one or more groups selected from alkyl (such as C1-C5 alkyl), halogen (e.g., chlorine or bromine), hydroxyl and carboxylic acid. Specifically, the soil to be treated may be contaminated with one or more aromatic compounds selected from the group consisting of benzene, toluene, xylene, naphthalene, phenol, and halogen-substituted benzene, which are often found as components of petroleum products.

The contaminants are treated in situ, converted to innocuous and natural occurring compounds (e.g. $H_2O$, $CO_2$, $Na_2CO_3$, $O_2$, halide ions). By acting up on the contaminant in place, the reagent serves to eliminate the possibility of vertical movement of the contaminant other than resulting from the act of vertical injection itself, which is often a concern in other remediation technologies. As a side advantage, natural iron oxide minerals (hematite, goethite, magnetite and ferrihydrite) present in soil not only do not hinder but even can catalyze organic compounds decomposition by Fenton agent production as side product. Another side advantage, aerobic biodegradation of contaminants can benefit from the presence of oxygen released during $H_2O_2$ decomposition, if large quantities of reagent need to be applied.

As seen in Example 1, the superoxide agent can effectively extract and oxidize soil contaminations as aliphatic and aromatic hydrocarbon. Typical examples of these contaminations are carbon tetrachloride (CTC, a halogenated organic compound) and xylene (an aromatic compound), both of which are toxic and are known to be present in biorefractory waste of the chemical, fuel and military industries. Under the conditions of the present invention, these contaminations were totally and swiftly mineralized in minutes according the stoichiometry as shown in Equation 1 and Equation 2.

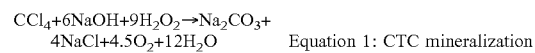

$CCl_4 + 6NaOH + 9H_2O_2 \rightarrow Na_2CO_3 + 4NaCl + 4.5O_2 + 12H_2O$     Equation 1: CTC mineralization

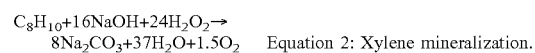

$C_8H_{10} + 16NaOH + 24H_2O_2 \rightarrow 8Na_2CO_3 + 37H_2O + 1.5O_2$     Equation 2: Xylene mineralization.

As shown in FIG. 2, CTC and xylene destruction by either sodium hydroxide or by hydrogen peroxide separately, was negligible. In contrast, when using mixtures of NaOH and hydrogen peroxide at appropriate molar ratios, rapid decomposition of CTC and xylene was observed.

Hydrogen peroxide is applied in the process in the form of an aqueous solution at a concentration which is preferably not less than 2.0M, more preferably not less than 2.25M or not less than 3.0M, more specifically not less than 10M, e.g., between 2.0M and 20M. Suitable hydroxide sources to be used are alkali hydroxide, e.g., sodium hydroxide and potassium hydroxide, with sodium hydroxide being most preferred. The hydrogen peroxide and the hydroxide source are combined in situ at the treatment site, such that the resultant superoxide-containing aqueous solution is put to use almost instantly, e.g., preferably within a period of time of not more than one minute, and even more preferably within less than five seconds, e.g., within one second, following the formation of the solution.

In any case, the concentrations and relative amounts of the two reactants are suitably adjusted such that the reaction results in the in situ formation of the superoxide radical anion $O_2^-$ by the following sequence of reactions:

$$2MOH + H_2O_2 \rightarrow M_2O_2 + 2H_2O \quad (I)$$

$$M_2O_2 + 2H_2O_2 \rightarrow 2MO_2 + 2H_2O \quad (II)$$

wherein M denotes the alkali metal, e.g., either sodium or potassium. To this end, the hydroxide source and hydrogen peroxide are combined in an aqueous solution in the soil. As explained above, the base is preferably injected in an aqueous form, with hydroxide concentration in the injected solution being not less than 1.5 M, preferably not less than 1.9 M, e.g., in the range of 2.25 to 20.0 M, and more preferably in the range of 3.0 to 9.0 M. The mol ratio between the hydrogen peroxide and the hydroxide ion combined in the solution is as set forth above, namely, above 1.2:1, e.g., in the range of 1.2:1 to 2:1, with a ratio of at least 1.4:1, e.g., from 1.4:1 to 1.6:1, and particularly around 1.5:1, being especially preferred. Under these conditions, the pH of the aqueous solution formed is higher than 10.0, preferably higher than 11.0, more preferably higher than 12.0 and most preferably not less than 13.0, e.g., from 12.0 to 14.0, and a workable amount of the active superoxide species is formed in the solution, such that the aqueous reagent is capable of oxidizing pollutants (petroleum products, aromatic compounds) in the contaminated soil.

The formation of the superoxide in the solution may be confirmed by means of Infrared spectroscopy. The characteristic IR stretching frequency of the $O_2^-$ species is at a wavelength of about 1108 cm$^{-1}$ [see L. Andrews, "*Infrared Spectrum, Structure, Vibrational Potential Function, and Bonding in the Lithium Superoxide Molecule LiO$_2$*", Journal of Chemical Physics, 1969 Volume 50, Number 10; Lester Andrews, "*Infrared Spectra and Bonding in the Sodium Superoxid and Sodium Peroxide Molecules*", The Journal of Physical Chemistry, 1969, Volume 78, Number 11]. Alternative methods for superoxide identification are based on Raman spectroscopy and Electron Paramagnetic Resonance spectroscopy (EPR).

The amounts of alkali hydroxide and hydrogen peroxide introduced into the soil are determined by various factors, such as the type and level of contaminants present, the desired level of decontamination sought to be achieved, and amount of soil to be treated. In general, assuming that the two reagents are combined in the most preferred molar ratio (i.e., in 1:1.5 molar ratio), then the following molar ranges have been shown to be useful for achieving fairly good degree of decontamination for many types pollutants, especially when the pollutants are localized within a given area (pollutant:MOH:H$_2$O$_2$): 1:0.8:1.2 to 1:20:30. If the exact location of the pollutant within the soil is unknown, or it is not uniformly distributed in the soil to be treated, then larger amounts of the aqueous reagent may be used.

Regarding the effect of soil temperature on the decontamination process, it was found that the initial temperature of the soil is not a very crucial parameter in soil remediation process of the invention, such that the method can be employed over a wide temperature range. The superoxide production reaction is an exothermic reaction. Therefore, as long as the initial reagents do not freeze, once the reaction started the temperature of soil will increase and the mineralization reaction will start. However, at very low initial temperature of soil (−13° C.), reaction conversion drops off maximum around 5% depends in a type of the soil (heat insulation of the soil). It is assumed that at low temperatures, the superoxide agent is formed more slowly than at 15-25° C. On the other hand, if the initial temperature of the soil is very hot, the natural evaporation of hydrogen peroxide is increased. This evaporation decreases the initial quantity of this major reagent and decreases the conversion of the mineralization process, as shown below. At initial soil temperature of +37° C. the reaction conversion decrease is maximum around 3% depends in a type of the soil. Therefore, the method of the invention may be applied over a wide temperature range (e.g., from −13° C. to +40° C.). Yet, for many types of soils tested, it was found that the preferred initial temperature of the soil for achieving most effective soil remediation is from 0 to 35° C., e.g., from 10 to 30° C.

As mentioned above, the invention is particularly directed to remediate contaminated soil where the pollutant is a petroleum product. Petroleum is a naturally occurring, yellow-to-black liquid found in geologic formations beneath the Earth's surface, which is commonly refined into various types of fuels. It consists of hydrocarbons of various molecular weights and other liquid organic compounds. The name petroleum covers both naturally occurring unprocessed crude oil and petroleum products that are made up of refined crude oil.

The term "petroleum" includes all liquid, volatile organic chemicals, and semi-solid hydrocarbons present in petroleum crude oil. The proportion of light hydrocarbons in the petroleum mixture varies greatly among different oil fields, ranging from as much as 97 percent by weight in the lighter oils to as little as 50 percent in the heavier oils and bitumens. The hydrocarbons in crude oil are mostly alkanes, cycloalkanes and various aromatic hydrocarbons while the other organic compounds contain nitrogen, oxygen and sulfur, and trace amounts of metals such as iron, nickel, copper and vanadium. The exact molecular composition varies widely from formation to formation. Four different types of hydrocarbon molecules appear in crude oil. The relative percentage of each varies from oil to oil, determining the properties of each oil. These are alkanes (paraffins) comprising from 15% to 60% of the crude oil, naphthenes comprising from 30% to 60% of the crude oil, aromatics comprising from 3% to 30% of the crude oil, and asphaltics which comprise the remainder of the crude oil.

One of the typical examples of petroleum products contamination is a treatment of soil contaminated by leftovers of diesel or oil. Diesel and oil derivatives are classified into the group of the most dangerous compounds for the environment.

Examples of petroleum products, according to the present invention, include but are not limited to both crude oil as well as refined products such as residual fuel oils, bunker fuel, diesel fuel and other hydrocarbon liquids such as paint thinner, gasoline and the like.

In particular, the term "petroleum product" includes oil of any kind or in any form, gasoline, diesel fuel, aviation fuel, fuel oil, kerosene, any product obtained from refining or processing of crude oil, liquefied petroleum gases, natural gas liquids, petrochemical feedstocks, condensate, waste or refuse mixtures containing any of such oil products, and any other liquid hydrocarbon compounds, as well as any mixtures thereof.

It should be noted that the terms "oil" and "fuel" are used interchangeably throughout the text.

Therefore, the present invention also encompasses the treatment of any oils, for example of vegetable oil.

As taught in the examples herein below, high conversion of 90% and higher was obtained after a very short contact time of 20 minutes, 40 minutes and no more than 2 hours. Therefore, according to preferred embodiments of the invention, the contact time ranges from several minutes to several days, e.g., 10 minutes to 10 days, or more specifically, 10 minutes to 72 hours, to obtain a conversion of at least 90% of the contaminants. Most preferably, the treatment time ranges from 10 minutes to 24 hours, or even less, e.g., up to 5 hours and sometimes even up to 2 hour.

As shown in the examples below, the high conversion rate of the process (above 90%) was obtained after a single cycle of treatment. By 'cycle of treatment' is meant the addition of the aqueous reagent to the soil, followed by a waiting period of not more than 5 hour, e.g., not more than 2 hours. Therefore, according to preferred embodiments of the invention, the process is conducted in a single cycle of treatment. As further shown in the examples below, the conversion rate can increase to 100% after conducting one or two cycles of treatment. Therefore, according to another preferred embodiment of the invention, the process results in a 100% conversion of the contaminants.

Experimental work conducted in support of this invention indicates that the incorporation of one or more organic additives together with the aqueous reagent into the polluted soil promotes the process of soil decontamination, leading to increased conversion level of the contaminants at faster reaction rates. Three groups of organic additives have been shown to advance the reaction: surface active agents, water-immiscible organic solvents and phase transfer catalysts.

Regarding the first group of organic additives consisting of surfactants, it should be noted that especially anionic surfactants and nonionic surfactants demonstrated utility in promoting the soil decontamination process of the invention. Preferred anionic surfactants include salts of long-chain carboxylic acid, e.g., with $C_{10}$-$C_{20}$ chains, especially the sodium or potassium salt of said acids, in particular salts of fatty acids, namely, soaps. Soap solution is an especially preferred additive. Other types of anionic surfactants include, for example, sulfates, such as alkyl sulfates (e.g., sodium or ammonium dodecyl sulfate). Preferred nonionic surfactants include compounds with polyethylene glycol chain, specifically polyoxyethylene fatty acid esters, such as polyoxyethylene sorbitan monooleate (Tween® 80) and polyoxyethylene sorbitan monostearate (Tween® 60); glycerol esters; nonionic soaps and glucosides.

Regarding the second group of organic additives consisting of water-immiscible organic solvent(s), preferably the solvent of choice is a fairly volatile solvent, e.g., with a boiling point of less 100° C. and even less than 80° C., which is capable of dissolving the contaminant to be treated. One or more solvents selected from the group consisting of halogenated and non-halogenated aliphatic hydrocarbons, and halogenated and non-halogenated aromatic hydrocarbons, are suitable for use, such as dichloromethane, hexane and a mixture thereof. Ultimately, these solvents are also destroyed by the aqueous reagent of the invention.

Regarding the third group of organic additives consisting of phase transfer catalysts, these are salts having nitrogen-containing cation, e.g., a quaternary ammonium cation, namely, $N^+R_1R_2R_3R_4$ wherein each of $R_1$, $R_2$, $R_3$ and $R_4$ is independently an C1-C18 alkyl group (preferably C1-C12 alkyl, which may be either linear or branched, most preferably linear) and a counter anion, e.g., halide anion such as chloride or bromide. Especially preferred are quaternary ammonium salts of the formula $N^+CH_3[(CH_2)_kCH_3]_3$ Hal-, wherein k is at least 5, e.g., between 5 to 9, and Hal is chloride or bromide. As an example of this preferred subclass of quaternary ammonium salts, methyltrioctyl ammonium halide can be mentioned (k=7), which is commercially available in the form of its chloride salt as Aliquat 336. Other examples include didodecyldimethylammonium bromide (DDAB); hexadecyltrimethylammonium bromide (CTAB); and tetraoctylammonium bromide (TOAB).

The organic additives are introduced into the soil by the injection of a separate stream, either before, concurrently with, or after the injection of the alkali hydroxide stream, and before, concurrently with, or after the addition of the hydrogen peroxide stream. Alternatively, the organic additive may be premixed with the base solution and/or the hydrogen peroxide solution and injected as previously described. In general, assuming that the alkali hydroxide and hydrogen peroxide are combined in the most preferred molar ratio (i.e., in 1:1.5 molar ratio), then the amount of the organic additive is preferably adjusted within the range of 0.01:1 to 1:1, preferably from 0.1:1 to 1:1 (additive: contaminant).

With the aid of the organic additive, especially an anionic surfactant, the process according to invention is preferably carried out over a period of time from 5 minutes to 1 hours, to achieve more than 95% conversion of the contaminant, and even more than 97 or 99% conversion, optionally on repeating the treatment for more than one time, e.g., via the application of two or more repeated treatment cycles.

IN THE FIGURES

EXAMPLES

Reagents and Materials

Figure 1:
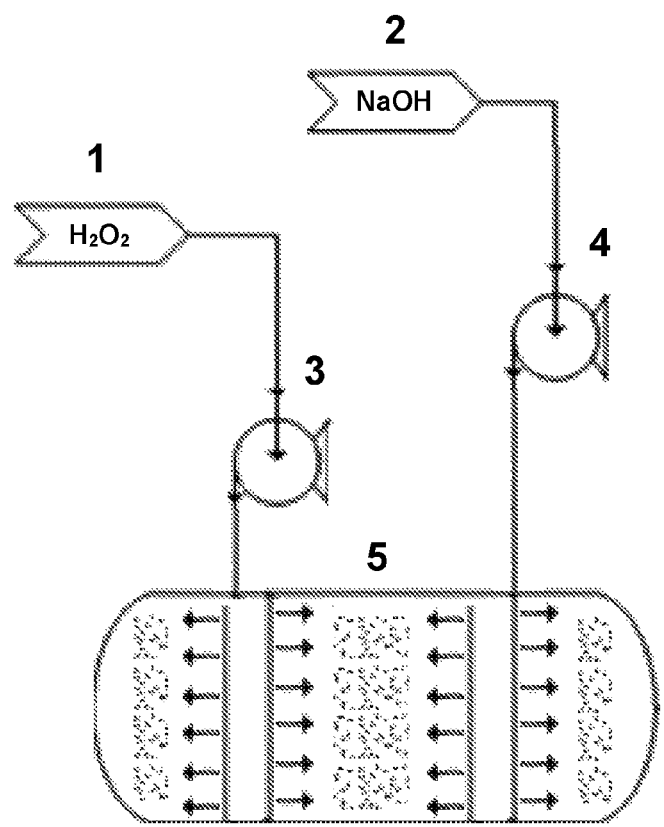
FIG. 1 is an illustration of an injection system suitable for conducting the process of soil remediation.

30% aqueous hydrogen peroxide solution was purchased from Bio Lab ltd (Israel).

Diesel and oil were purchased from Paz ltd (Israel).

Unless indicated otherwise, other materials and solvents were purchased from Sigma-Aldrich ltd and were used without further purification.

Measurements

Organic mixtures were analyzed by means of GC (FID detector), column 30 m, 0.32 mm ID, 0.25 μm Resteck Famewax™. Peak areas were compared to a standard curve of each hydrocarbon prepared in dichloromethane.

The chloride anion in aqueous phase was assayed by volumetric titration of $AgNO_3$, 0.1 N, (using 5 w/w % $K_2CrO_4$ as indicator). Solid end products were separated by filtration and analyzed by FTIR and XRD.

FTIR studies were conducted using React IR 4000, manufactured by Metler Ltd. XRD studies were conducted using X-ray diffractometer, Range: 1100<2θ>1680, D8 advance by Bruker AXS.

TOC studies were conducted by using TOC analyzer N/C UV HS, Analytic-Jena, Germany Ltd.

The set of experiments described in Examples 1 to 5 illustrates the mineralization of aromatic and aliphatic hydrocarbons in soil by $NaO_2$ formed in situ. The experiments were carried out with artificially spiked soil samples at a temperature in the range from −13° C. to +37° C. in a laboratory scale. The experiments were conducted in an adiabatic glass reactor (500 ml) containing 60 grams of soil types A, B, C and D respectively. The compositions and pH values of the soil samples tested are tabulated in Table 1.

TABLE 1

| Classification | Soil A | Soil B | Soil C | Soil D |
|---|---|---|---|---|
| % Sand | 36.6 | 62.9 | 100 | 28.8 |
| % Clay | 37.8 | 14.1 | 0 | 52.7 |
| % Silt | 9 | 13.3 | 0 | 9.7 |
| % carbonate minerals | 16.6 | 9.7 | 0 | 8.8 |
| % Organic Carbon | 0.5 | 0.5 | 0 | 0.5 |
| pH | 8.4 | 7.9 | 5.5 | 7.4 |

The soils were preliminarily dried at 100° C. and were artificially spiked with contaminants by adding the contaminant. Initial concentrations of contaminants were verified by the analysis of at least four replicates. The initial concentrations of varied contaminations in soil matrix are shown in Table 2 below. The pH's of untreated soil were 8.4, 7.9, 5.5 and 7.4 respectively. Two different syringes (50 ml each) were used to inject the reagents into the soil; one syringe contained sodium hydroxide solution and the other hydrogen peroxide solution (30%) and suitable volumes were injected to supply the desired molar quantities of the reagents as set out in the following examples. The reaction was continued for 20 minutes at room temperature unless otherwise indicated. After the treatment the aqueous and organic phases of the samples were separated and extracted with 20 ml of dichloromethane. The organic phases were combined and analyzed. The organic solution was measured with GC-FID and TOC analysis. The solid phase was washed filtered and dried and analyzed by means of XRD and FTIR.

TABLE 2

| Contamination | Initial concentration (mg/kg) |
|---|---|
| Phenol | 2,000-10,000 |
| Toluene | 2,000-10,000 |
| Xylene | 2,000-10,000 |
| Chlorobenzene | 2,000-10,000 |
| Bromobenzene | 2,000-10,000 |
| Naphthalene | 2,000-10,000 |
| Fuel Diesel | 10,000-300,000 |
| Crude Oil | 100,000-300,000 |

Example 1

Mineralization of Contamination by Sodium Superoxide

The example demonstrates the efficacy of the superoxide reagent as ISCO agent for effective soil remediation for halogenated aliphatic hydrocarbon and non-halogenated aromatic compound. The protocol set forth above was employed and two contaminants, carbon tetrachloride (CTC) and xylene, were treated separately, and their concentrations measured both by GC and TOC analysis.

The GC and TOC analysis of the reaction products (soil after treatment) shows that there are no traces of either CTC or xylene respectively. The only solid products were sodium carbonate and sodium chloride (in the case of CTC) as expected. Carbon tetrachloride and xylene swiftly mineralized in <95%, as shown in Table 3, which describes the destruction of CTC and xylene by superoxide agent, at the following reaction conditions: 0.25 mol of sodium hydroxide, 0.37 mol of hydrogen peroxide and 2,000 mg/kg (0.013 mol) of CTC or xylene in soil type A.

TABLE 3

| | CTC (GC - mg/kg) | Xylene (GC - mg/kg) | CTC (TOC - ppm) | Xylene (TOC - ppm) |
|---|---|---|---|---|
| Initial concentration | 2,000 | 2,000 | 2,000 | 2,000 |
| Final concentration | 0 | 0 | <10* | <10* |

*Sensitivity of the method

Example 2

Effect of Sodium Hydroxide:Hydrogen Peroxide Molar Ratio on the Decontamination Process The mineralization kinetics of halogenated solvents (CTC) and aromatic hydrocarbons (xylene) were tested in different soil samples, on varying the sodium hydroxide: hydrogen peroxide mol ratio and contaminant:soil w/w ratio.

To this end, the experimental protocol set forth above was employed. Reaction conditions were:

0-2.0 mol sodium hydroxide, 0-3.0 mol hydrogen peroxide, 0.1 mol CTC or 0.02 mol of xylene, and 50 gram of soil type A, B, C and D. Reaction time was 20 minutes.

Figure 2:
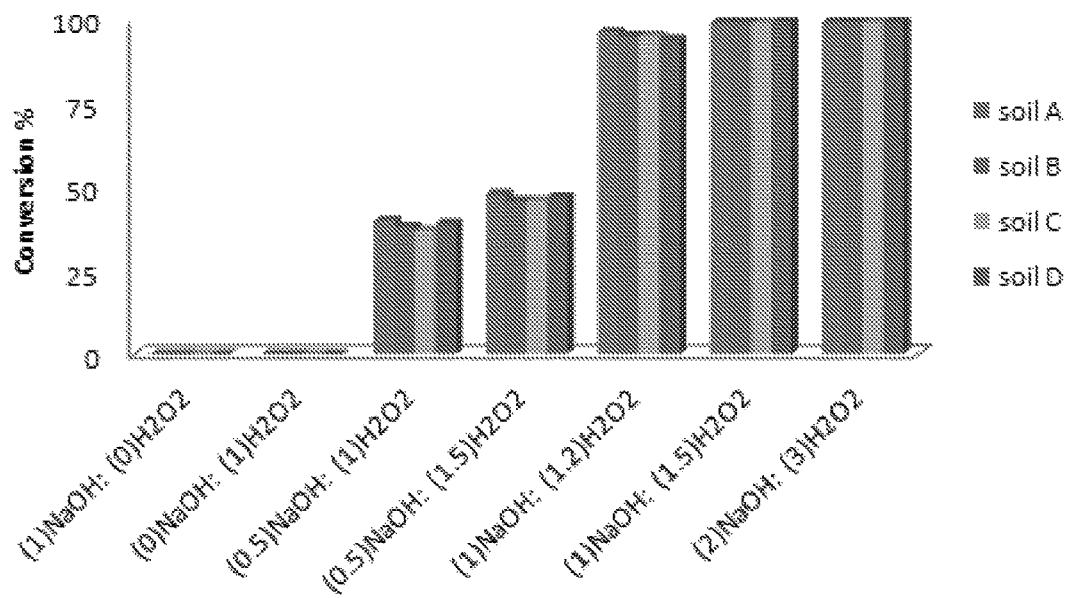
FIG. 2 is a bar diagram showing the effect of sodium hydroxide and hydrogen peroxide mol ratio on reaction conversion of xylene in different types of soil.
Figure 3:
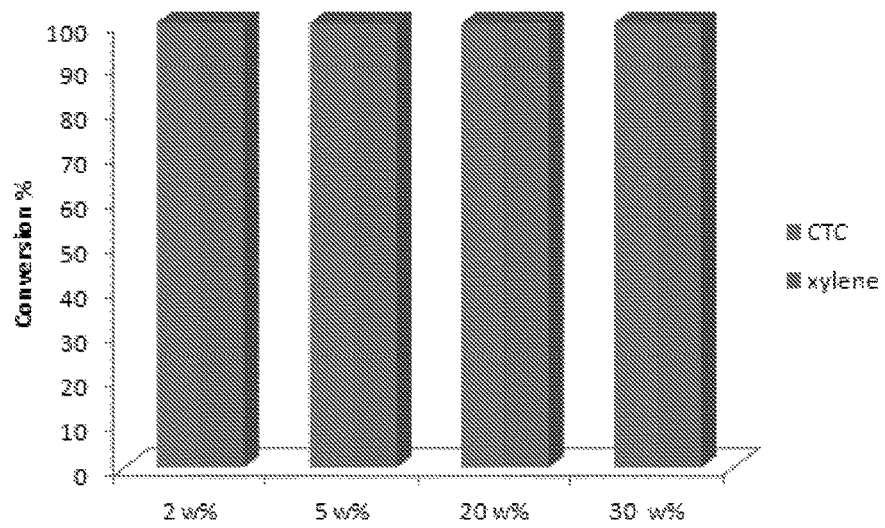
FIG. 3 is a bar diagram showing the degree of conversion achieved in soil contaminated with CTC and xylene at various contamination levels (from 2 to 30% by weight).

Results are shown in FIG. 2 and FIG. 3. The results indicate that under conditions allowing the generation of superoxide (when the hydrogen peroxide and sodium hydroxide are fed at 1.5:1 molar ratio), complete destruction of carbon tetrachloride and xylene is achieved in all types of soil samples tested (in FIG. 2, each bar consists of four individual bars for soils A-D from left to right). Furthermore, as shown in FIG. 3, the complete destruction of the contaminant is achieved over a wide range of concentrations of contaminants in the soil (soil type A).

Example 3

Effect of Soil Temperature on the Decontamination Process

To test the effect of soil temperature on the decontamination treatment, the experimental protocol set forth above was employed. Reaction conditions were: 0.25 mol of sodium hydroxide, 0.37 mol of hydrogen peroxide and 6,150 mg/kg of xylene in soil type A, B, C and D, at soil temperature between −13° C. and +37° C. (−13° C., 0° C., 25° C. and 37° C. from left to right). The reaction lasted 20 minutes.

Figure 4:
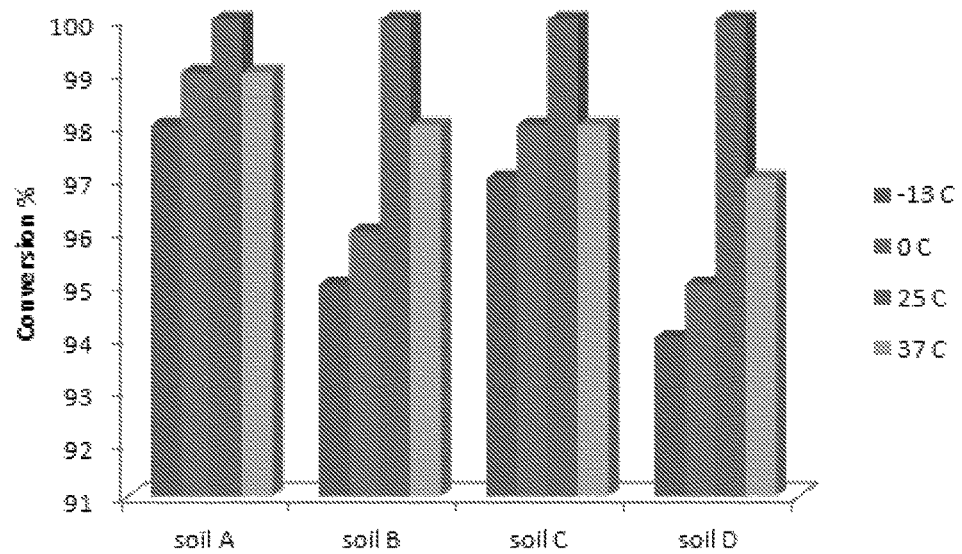
FIG. 4 is a bar diagram showing xylene remediation as function of soil temperature and soil type.

The results are shown in FIG. 4 in the form of a bar diagram indicating the high efficacy of the decontamination achieved (above 90% conversion of the contaminant) over the entire range of soil temperature tested. Complete conversion was measured at 25° C. for all types of soils tested.

Example 4

Effect of Pollutant of the Decontamination Process

To illustrate the applicability of the aqueous reagent of the invention in decontaminating a wide range of aromatic hydrocarbons in soil, the general procedure set forth above was employed to destroy the following exemplary pollutants: phenol, toluene, xylene, chlorobenzene and bromobenzene. Reaction Conditions were: 0.25 mol sodium hydroxide, 0.36 mol hydrogen peroxide, 0.03 mol aromatic hydrocarbon contaminant in soil type A, B and C. The reaction time 20 was minutes.

Figure 5:
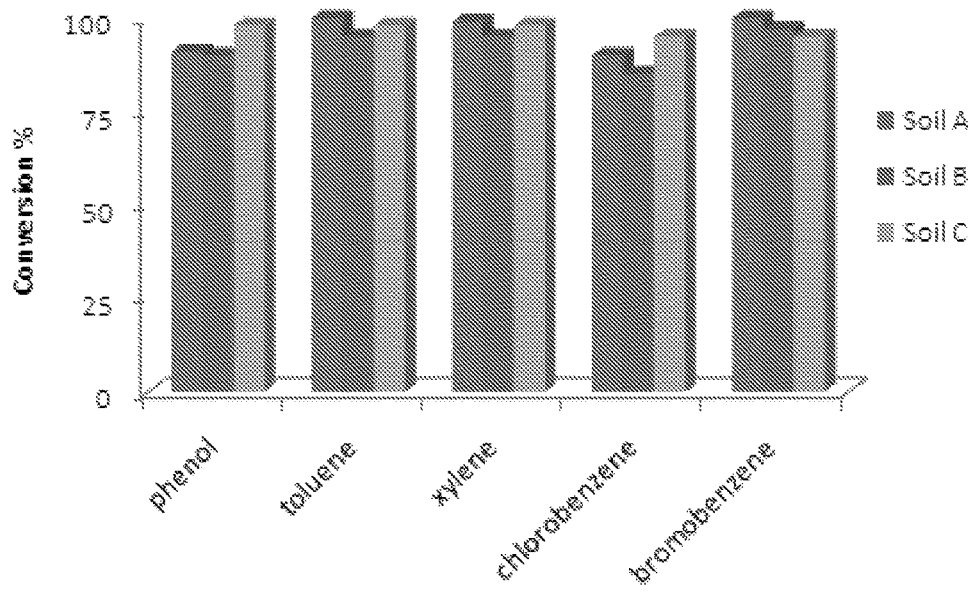
FIG. 5 is a bar diagram showing the destruction of aromatic hydrocarbons by the aqueous reagent in different soils.

The results shown in FIG. 5 indicate that a wide range of aromatic compounds (alkyl-substituted aromatic compounds, halogen-substituted aromatic compounds and hydroxy-substituted aromatic compounds) could be destroyed in different types of soils with the aid of the aqueous reagent of the invention (soil A, B and C from left to right in each stack of bars).

Example 5

Diesel and Crude Oil Removal

To illustrate the applicability of the reagent of the invention in decontaminating diesel and crude oil, the general procedure set forth above was employed under the following conditions: 0.25 mol sodium hydroxide, 0.36 mol hydrogen peroxide, 10 wt % of contamination in soil type A (diesel or crude oil contaminant). Reaction time was 20 minutes.

Figure 6:
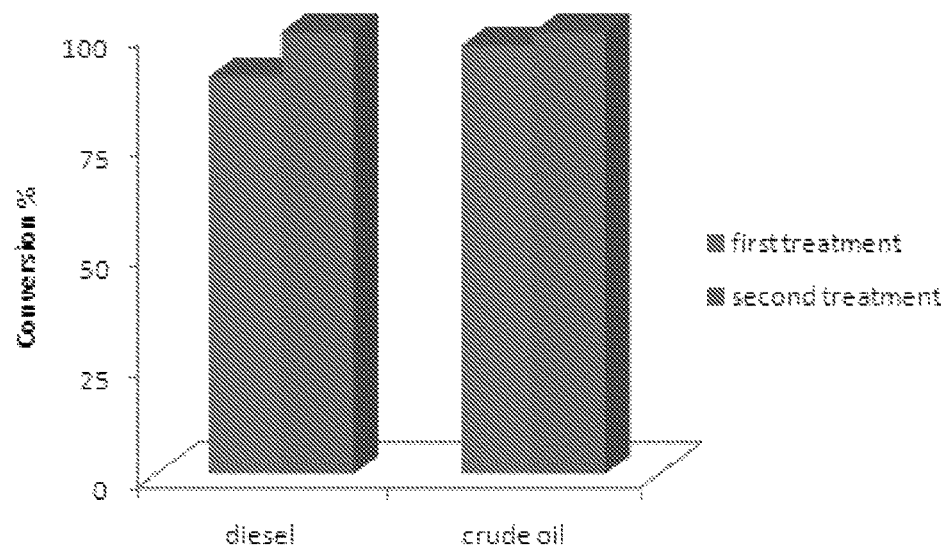
FIG. 6 is a bar diagram showing the destruction of diesel and crude oil by the aqueous reagent of the invention.

At room temperature and standard pressure, diesel and oil were swiftly mineralized in more than 90% yield, after one cycle of treatment, and completely mineralized after a second treatment cycle, as shown in FIG. 6. The end product of this remediation process was found to be sodium carbonate, as shown by XRD analysis.

Example 6

A Comparison Between the Superoxide Reagent of the Invention and Other Reagents in Accomplishing In-Situ Soil Remediation The superoxide reagent of the invention was employed according to the procedure set forth above. 0.25 mol sodium hydroxide and 0.37 mol of hydrogen peroxide (30%) were added to the reactor which was previously charged with 50 g soil type A contaminated with 10,000 mg/kg of xylene. The decontamination process consisted of two cycles: a first reaction which lasted twenty minutes, followed by another injection of the reagents and a second reaction which also lasted twenty minutes (total reaction time 40 minutes).

As a first comparative agent, the Fenton reagent was tested. 0.37 mol of hydrogen peroxide (30% solution), iron oxide (10% by weight relative to the contaminant) and 5 ml of $H_2SO_4$ were Added to the reactor which was previously charged with 50 g soil type A contaminated with 10,000 mg/kg of xylene. Reaction time was one hour.

As a second comparative agent, sodium persulfate was tested. 0.37 mol of sodium persulfate and 5 ml of $H_2SO_4$ were added to the reactor which was previously charged with 50 g soil type A contaminated with 10,000 mg/kg of xylene. Reaction time was one hour.

Figure 7:
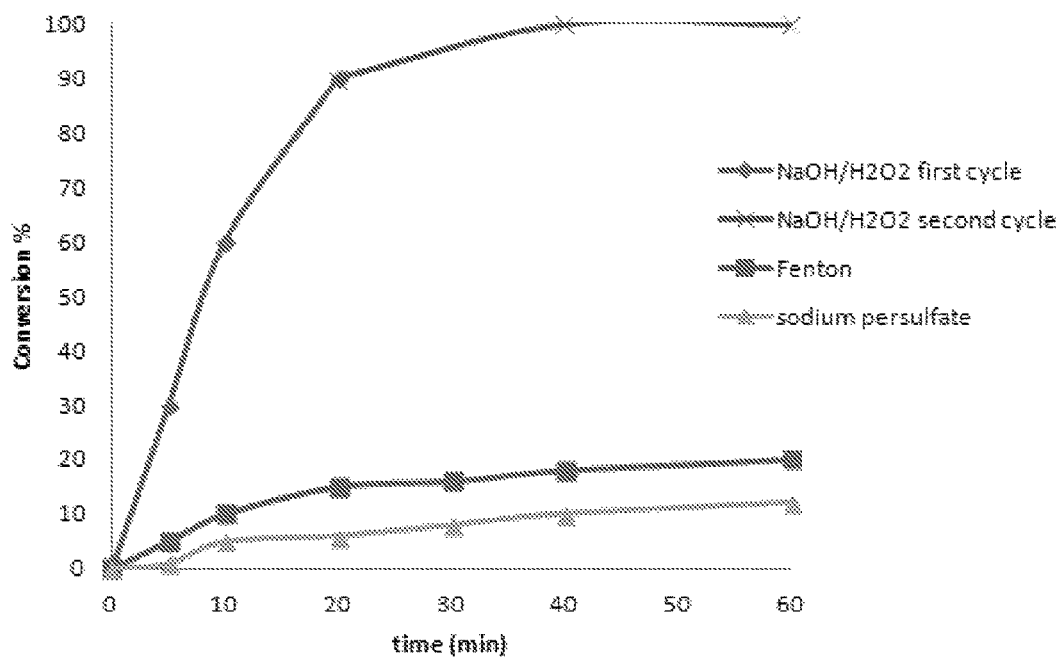
FIG. 7 is a graph where the progress of decontamination reaction is plotted versus reaction time for different soil remediation processes.

The results are graphically presented in FIG. 7 where xylene conversion is plotted as function of the reaction time for each of the three experiments. The curve marked with rhombuses and crosses corresponds to the decontamination achieved with the sodium hydroxide/hydrogen peroxide reagent (through the first and second treatment cycles, respectively). The results obtained for the comparative reagents, i.e., the Fenton reagent and the persulfate, are indicated with squares and triangles, respectively. The kinetic and conversion advantage offered by the present invention over leading market technologies for in situ soil remediation is clearly illustrated. The sodium hydroxide/hydrogen peroxide reagent achieves more than 90% of soil remediation after first cycle of treatment (lasting twenty minutes) and 100% of remediation after second cycle of treatment (additional twenty minutes).

Example 7

Pipes Corrosive

The corrosion experienced by metal pipes was tested in the presence of the oxidizing agent of the invention under severe reaction conditions.

Reaction conditions were: 1 mol sodium hydroxide, 2 mol hydrogen peroxide, type of metal test CS 1010, 60 grams soil type A, reaction time 100 hours.

Figure 8:
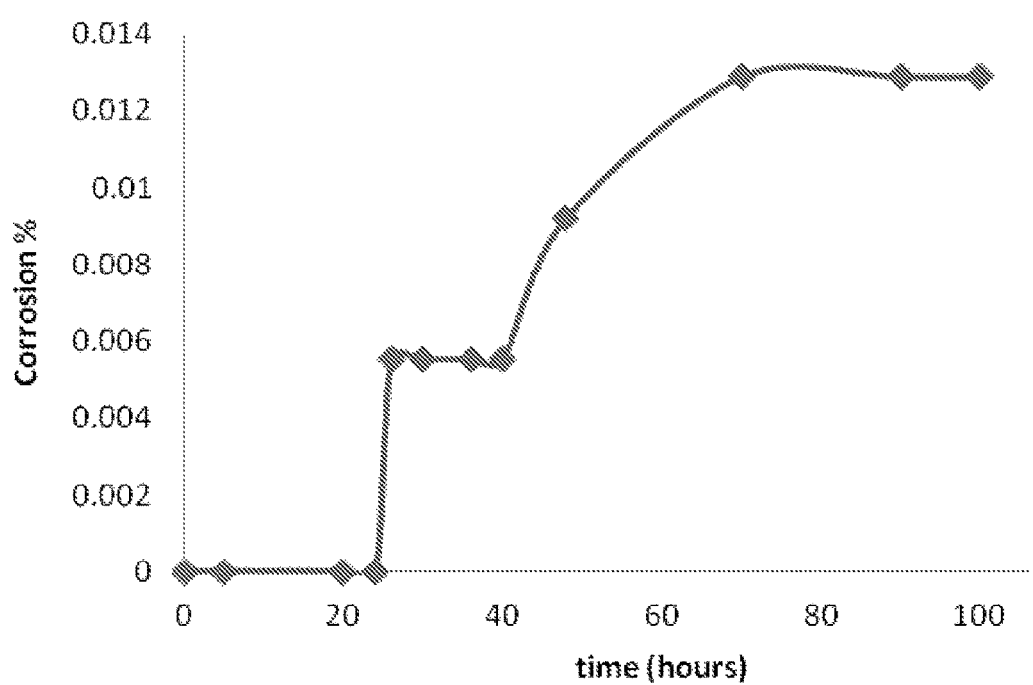
FIG. 8 shows the gravimetric measurement of pipes corrosiveness on exposure to the reagent of the invention.

The results shown in FIG. 8 demonstrate that the pipes corrosion caused due to the exposure of the pipes to the aqueous reagent of the present remediation method was 0.012% after 100 hours (gravimetric method).

The next set of experiments described in Examples 8 to 21 illustrates the decontamination of soil samples with high level of crude oil contamination (around 100,000 mg oil per one kilogram soil), collected from different countries. The decontamination was achieved with the aid of the aqueous reagent of the invention ($H_2O_2$ and MOH under conditions generating superoxide) in combination with various organic additives. The experimental set-up used is the same experimental set-up described above in reference to previous examples; the organic additive was injected using either a third syringe or was premixed with the base or $H_2O_2$ solutions.

Examples 8-12

A refinery sludge sample from Kazakhstan with roughly 100,000 mg crude oil contamination per one kilogram soil was subjected to a decontamination treatment in an adiabatic glass reactor according to the general procedure set out above. An aqueous sodium hydroxide solution at a concentration of 5M and an aqueous hydrogen peroxide solution at a concentration of 6M were injected to the soil and different organic additives were also fed to the reactor, to test their ability to promote the decontamination process. The additives tested were:
quaternary ammonium salt Aliquat 336 (phase transfer catalyst) glycerol (as a nonionic surfactant-like additive)
soap solution (commercially available from Shahaf, Israel—an anionic soap)
a mixture of dichloromethane and hexane (organic solvents)

The experimental details (amounts of reagents employed) and results (i.e., degree of conversion achieved and time needed to accomplish the decomposition of the contaminant) are tabulated in Table 4.

TABLE 4

| Example | NaOH (mole) | $H_2O_2$ (mole) | Organic additive (0.025 mole) | Conversion (%) | Reaction time (min) |
|---|---|---|---|---|---|
| 8 | 0.25 | 0.37 | — | 90 | 60 |
| 9 | 0.25 | 0.37 | quaternary ammonium salt | 97 | 30 |
| 10 | 0.25 | 0.37 | glycerol | 98 | 30 |
| 11 | 0.25 | 0.37 | Industrial soap | 100 | 20 |
| 12 | 0.25 | 0.37 | dichloromethane and hexane | 100 | 30 |

Figure 9:
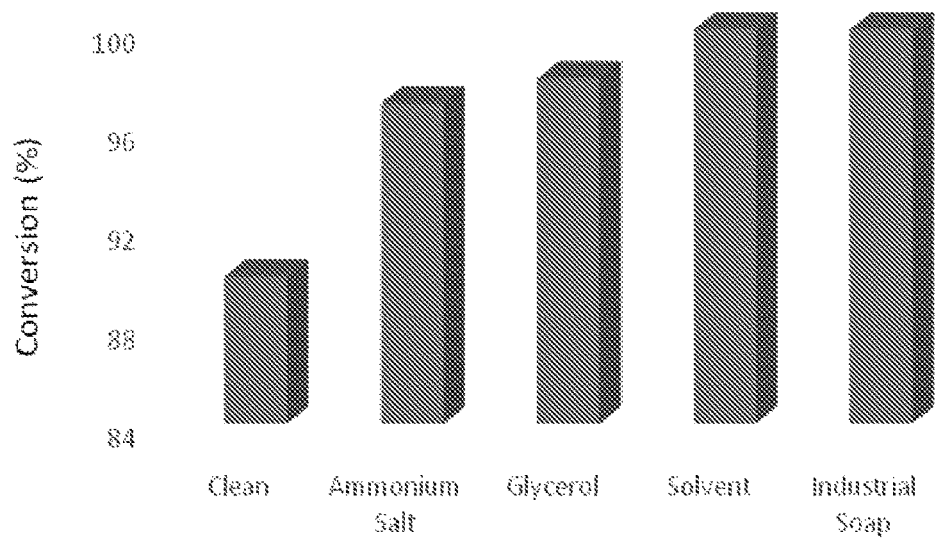
FIGS. 9 and 10 are bar diagrams showing contaminant conversion achieved, and corresponding reaction times, respectively, on applying the aqueous reagent of the invention together with different organic additives to a contaminated soil sample from Kazakhstan.
Figure 10:
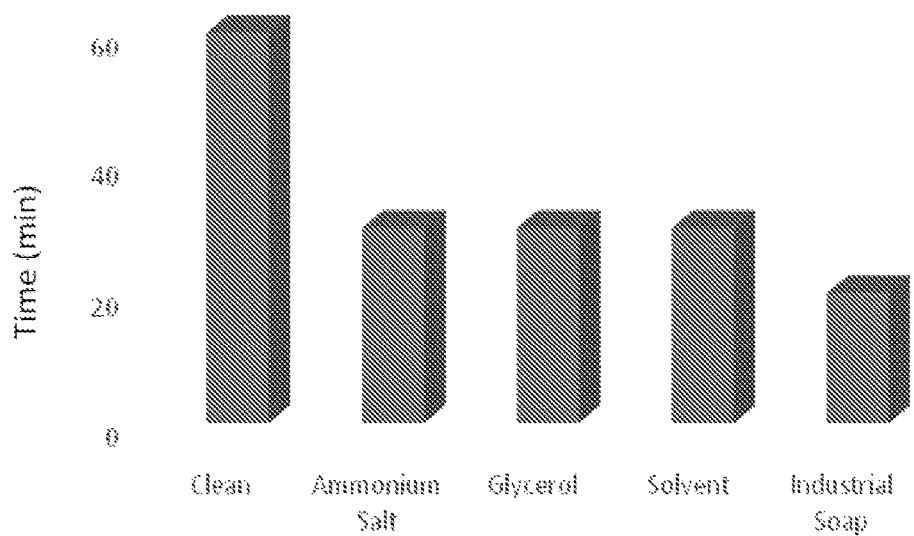

The results are also graphically presented in FIGS. 9 and 10 in the form of bar diagrams showing the conversion achieved and the corresponding reaction times, respectively (the left bar in the diagrams stands for the "clean", additive-free aqueous reagent consisting only of hydrogen peroxide and sodium hydroxide). The results clearly indicate that with the aid of surfactants, especially soaps, higher conversion at faster reaction rates are attainable.

Examples 13-16

The experimental procedure described in Examples 8 to 12 was repeated, but this time with a contaminated soil sample collected in China with roughly 100,000 mg crude oil contamination per one kilogram soil. An aqueous sodium hydroxide solution at a concentration of 5M and an aqueous hydrogen peroxide solution at a concentration of 6M were injected to the soil and several additives were tested (a quaternary ammonium salt, a mixture of organic solvents consisting of dichloromethane and hexane and a soap solution as set out above). In each case, the decontamination reaction was allowed to run for 60 minutes and the conversion level was measured.

The experimental details and degree of conversion achieved are tabulated in Table 5.

TABLE 5

| Example | NaOH (mole) | $H_2O_2$ (mole) | Organic additive (0.025 mole) | Conversion (%) | Reaction time (min) |
|---|---|---|---|---|---|
| 13 | 0.25 | 0.37 | — | 90 | 60 |
| 14 | 0.25 | 0.37 | quaternary ammonium salt | 95 | 60 |
| 15 | 0.25 | 0.37 | Industrial soap | 99 | 60 |
| 16 | 0.25 | 0.37 | dichloromethane and hexane | 99 | 60 |

Figure 11:
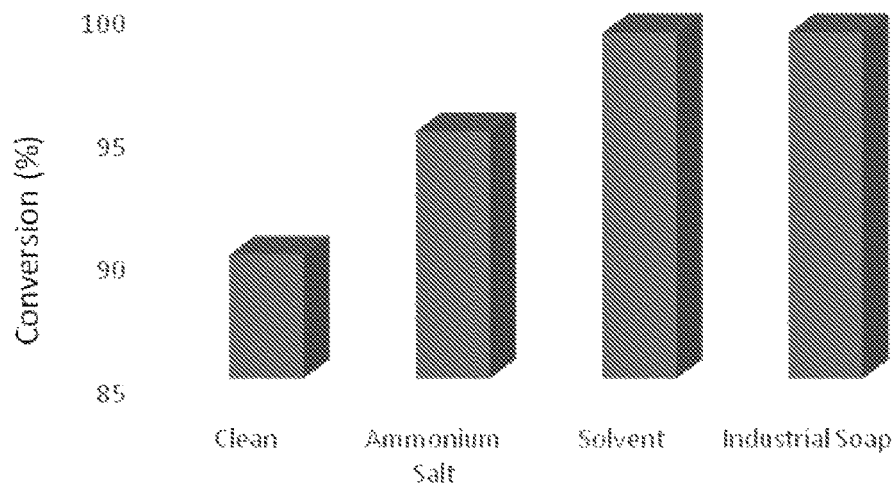
FIG. 11 is a bar diagram showing contaminant conversion achieved on applying the aqueous reagent of the invention together with different organic additives to a contaminated soil sample from China.

The results shown graphically in FIG. 11 indicate that the addition of solvents mixture or an anionic surfactant leads to increased conversion of the contaminant, achieving, especially with the aid of a soap solution, nearly 100% conversion (the left bar in the diagram stands for the "clean", additive-free aqueous reagent consisting of hydrogen peroxide and sodium hydroxide).

Examples 17-21

The soap solution emerging from the studies reported in examples 8 to 16 as an effective additive for promoting the decontamination process was tested together with the aqueous reagent of the invention in treating different types of diesel and crude oils contaminants in soil. To demonstrate the effect of the additive, the aqueous reagent was tested either alone (see Examples 17A, 18A, 19A, 20A and 21A) or in combination with the soap solution (see Examples 17B, 18B, 19B, 20B and 21B). The experimental details (type of contaminant, amounts of reagents, reaction time) and the results (degree of conversion achieved) are tabulated in Table 6.

TABLE 6

| Ex. | Type of oil contamination | NaOH (mol) | $H_2O_2$ (mol) | Soap solution (mol) | Reaction time (min) | Conversion (%) |
|---|---|---|---|---|---|---|
| 17A | Venezuela oil | 0.25 | 0.37 | 0.025 | 30 | 88 |
| 17B | | 0.25 | 0.37 | 0.025 | 30 | 98 |
| 18A | Saratoga oil | 0.25 | 0.37 | 0.025 | 30 | 90 |
| 18B | | 0.25 | 0.37 | 0.025 | 30 | 98 |
| 19A | Used oil | 0.25 | 0.37 | 0.025 | 30 | 98 |
| 19B | | 0.25 | 0.37 | 0.025 | 30 | 99 |
| 20A | Tamie oil | 0.25 | 0.37 | 0.025 | 30 | 99 |
| 20B | | 0.25 | 0.37 | 0.025 | 30 | 100 |
| 21A | Diesel oil | 0.25 | 0.37 | 0.025 | 30 | 99 |
| 21B | | 0.25 | 0.37 | 0.025 | 30 | 100 |

Figure 12:
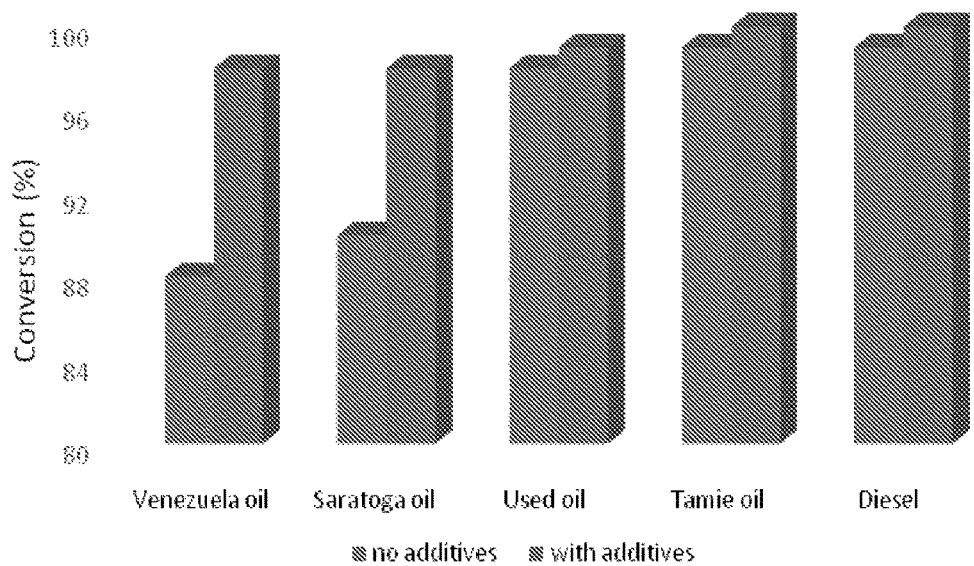
FIG. 12 is a bar diagram showing the combined effect of the aqueous reagent of the invention together with an anionic surfactant on destroying different types of diesel and oils.

The results, which are also shown graphically in FIG. 12, indicate that the addition of a soap solution consistently increases the level of decontamination achieved (in each pair of adjacent bars, the left bar stands for the application of the aqueous reagent alone and the right bar for the combination of the aqueous reagent and soap solution, respectively).

The invention claimed is:
1. A site remediation process for treating a soil contaminated with a pollutant selected from the group consisting of petroleum products and non-halogenated aromatic hydrocarbons, comprising bringing into contact with said soil an aqueous solution in which hydrogen peroxide and alkali hydroxide are combined, wherein said alkali hydroxide and hydrogen peroxide mix in an aqueous form in the contaminated soil by injecting into the contaminated soil a stream of aqueous alkali hydroxide solution having concentration of not less than 1.5M and a stream of aqueous hydrogen peroxide solution having concentration of not less than

2.25M, wherein the alkali hydroxide solution is introduced to the soil and allowed to seep into the ground, followed by the addition the hydrogen peroxide solution.

2. The process according to claim 1, comprising injecting into the contaminated soil a stream of aqueous alkali hydroxide solution and a stream of aqueous hydrogen peroxide solution, such that a molar ratio between the hydrogen peroxide and the alkali hydroxide is in the range from 1.2:1 to 1.8:1.

3. The process according to claim 1, wherein the soil is contaminated with a petroleum product selected from the group consisting of petroleum, gasoline, crude oil, diesel fuel, diesel oil, aviation fuel, fuel oil, jet fuel, kerosene, liquefied petroleum gases, natural gas liquids, petrochemical feedstocks and any mixtures thereof.

4. The process according to claim 3, wherein said petroleum product is diesel oil, crude oil or both.

5. The process according to claim 1, further comprising introducing into the soil at least one organic additive selected from the group consisting of (i) surface active agents (ii) water-immiscible organic solvent and (iii) phase transfer catalysts.

6. The process according to claim 5, wherein the additive is a surface active agent which is an anionic surfactant.

7. The process according to claim 6, wherein the anionic surfactant(s) are selected from the group consisting of salts of long-chain ($C_{10}$-$C_{20}$) carboxylic acids.

8. The process according to claim 6, wherein the anionic surfactant is the sodium or potassium salt of a fatty acids.

9. The process according to claim 6, wherein the anionic surfactant is a soap solution.

10. The process according to claim 5, wherein the additive is a water-immiscible organic solvent or a mixture of such solvents.

11. The process according to claim 5, carried out over a period of time from 10 minutes to two hours to achieve at least 95% conversion of the contaminant(s).

12. The process according to claim 1, carried out over a period of time from 10 minutes to 72 hours to obtain at least 90% conversion of the contaminant(s).

13. The process according to claim 1, wherein metal surfaces are in contact with the soil to be treated.

* * * * *